June 8, 1943.  W. R. McKAY  2,321,226
AUTOMATIC VARIABLE SPEED TRANSMISSION MECHANISM
Filed July 19, 1941  2 Sheets-Sheet 1
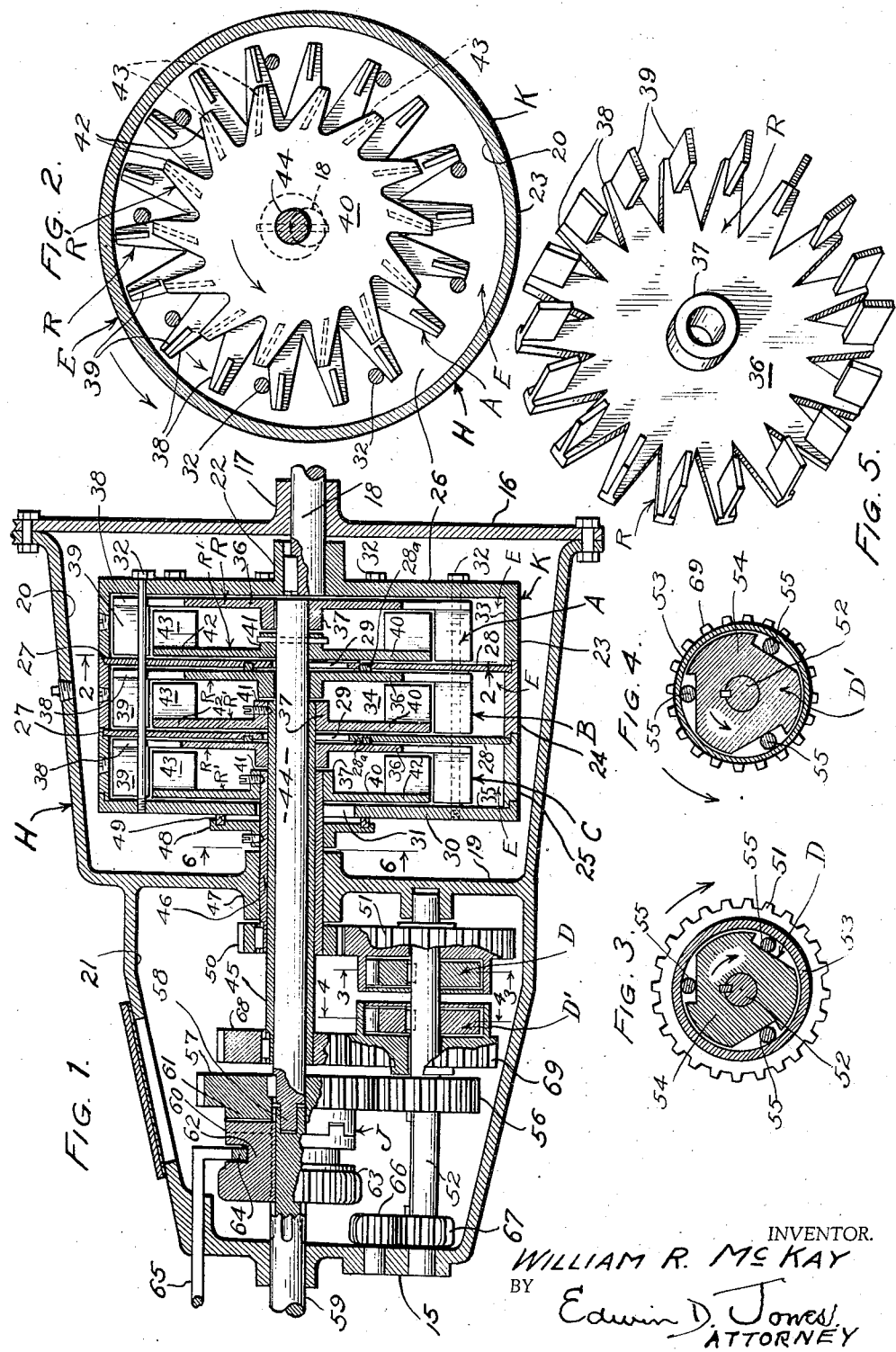
INVENTOR.
WILLIAM R. McKAY
BY Edwin D. Jones
ATTORNEY June 8, 1943.    W. R. McKAY    2,321,226
AUTOMATIC VARIABLE SPEED TRANSMISSION MECHANISM
Filed July 19, 1941    2 Sheets-Sheet 2
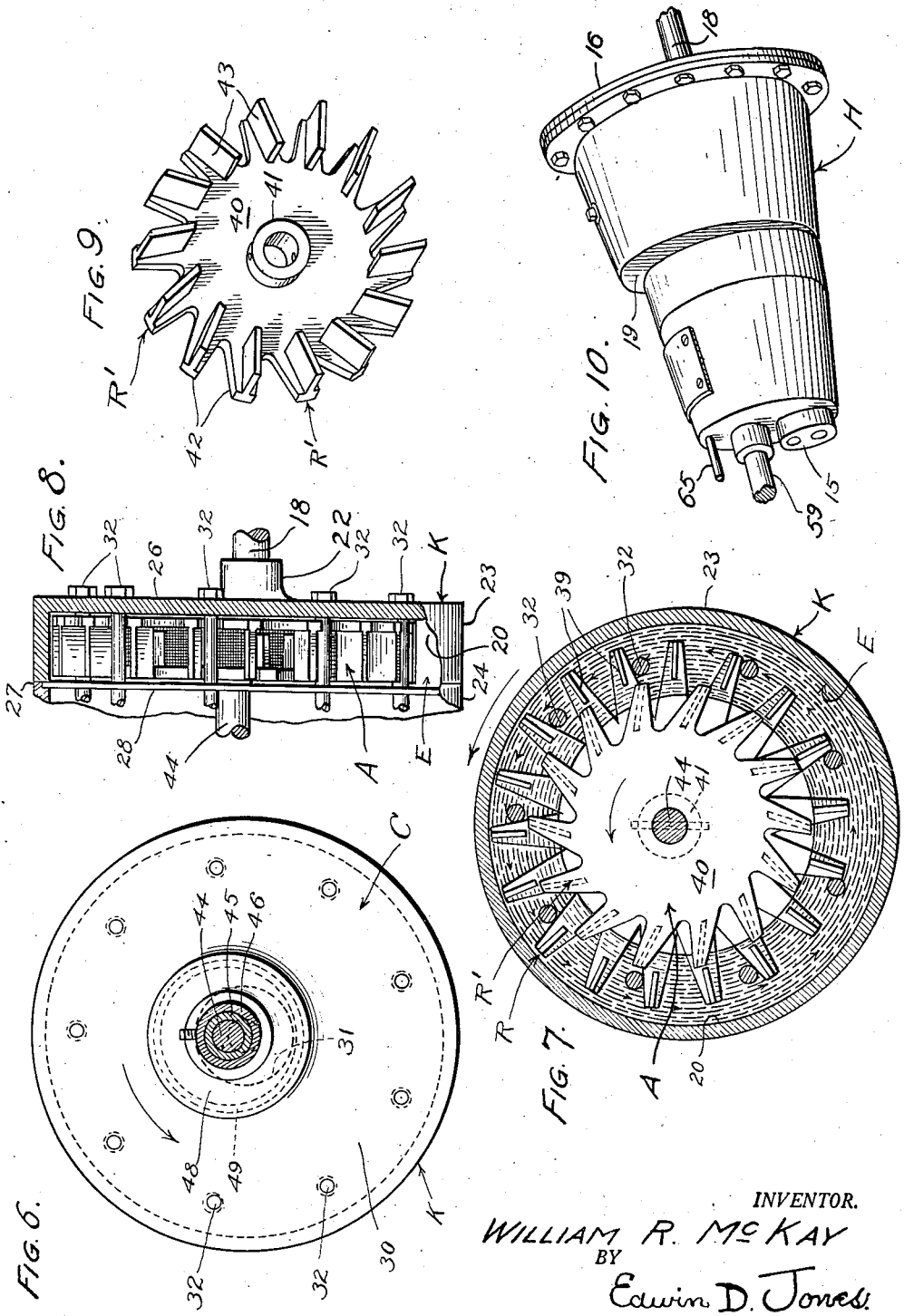
INVENTOR.
WILLIAM R. McKAY
BY
Edwin D. Jones
ATTORNEY.

Patented June 8, 1943

2,321,226

UNITED STATES PATENT OFFICE 2,321,226

AUTOMATIC VARIABLE SPEED TRANSMISSION MECHANISM

William R. McKay, Southgate, Calif., assignor of one-half to Harry F. Langlois and Herbert N. Langlois Application July 19, 1941, Serial No. 403,167

2 Claims. (Cl. 74—189.5)

My invention relates to variable speed transmission mechanism, and it has particular reference to those types of mechanisms which are entirely automatic for the transmission of speed at different ratios in accordance with changes in speed and torque.

It is a purpose of my invention to provide an automatic variable speed transmission mechanism which is characterized by one or more fluid clutches, and a selective speed transmission having power trains of different speed ratios, so correlated to the clutches as to be automatically selectable at a time determined by speed and torque.

It is also a purpose of my invention to provide a fluid clutch which provides increased power transmission from driving rotor to driven rotor, over previously designed clutches; and one which offers a concentric arrangement of driving and driven rotors to reduce the overall width of the clutch, thereby permitting the arrangement of a plurality of such clutches within a relatively small compass and in association with the selective speed transmission in the formation of the complete transmission mechanism of my invention.

I will describe only one form of automatic variable speed transmission mechanism, and one form of fluid clutch, each embodying my invention, and will then point out the novel features thereof in claims.

In the accompanying drawings:

Fig. 1 is a view showing in vertical longitudinal section, one form of automatic variable speed transmission mechanism embodying my invention.

Fig. 2 is a vertical sectional view taken on the line 2—2 of Fig. 1 and looking in the direction of the arrows.

Fig. 3 is a vertical sectional view taken on the line 3—3 of Fig. 1 and looking in the direction of the arrows.

Fig. 4 is a view similar to Fig. 3 and taken on the line 4—4 of Fig. 1 and looking in the direction of the arrows.

Fig. 5 is a view showing in perspective the driving rotor of the fluid clutch shown in Fig. 2.

Fig. 6 is a vertical sectional view taken on the line 6—6 of Fig. 1 and looking in the direction of the arrows.

Fig. 7 is a view similar to Fig. 2 but showing the position of the fluid when the clutch is in operation.

Fig. 8 is a fragmentary view with the casing of the mechanism broken away and showing one of the fluid clutches in edge elevation.

Fig. 9 is a detail perspective view of the driven rotor of the clutch shown in Fig. 8.

Fig. 10 is a perspective view on a reduced scale, showing the mechanism illustrated of Fig. 1 completely housed.

Similar reference characters refer to similar parts in each of the several views.

Referring specifically to the drawings, and first to Figs. 1 and 9 the transmission mechanism embodying my invention, comprises a housing H having a rear wall 15, and closed at its front end by a plate 16 bolted to the housing and which may form part of the rear end of the crank case of an internal combustion engine for a motor vehicle. This plate 16 is formed with a bearing 17 in which is journalled the rear end portion of the shaft 18 of the engine.

By a partition 19 the housing H is divided interiorly into a front compartment 20 and a rear compartment 21. In the rear compartment is contained a selective gear transmission, while in the front compartment is contained a plurality of fluid clutches. In the present instance, there are three fluid clutches designated A, B, and C. For the purposes of my invention these fluid clutches may be of the conventional type, that is to say, each may consist of a driving rotor for circulating a suitable fluid to transmit torque to a driven rotor.

All three clutches are contained within a casing K, the forward side of which is provided with an axially disposed collar 22 into which projects the rear end of the engine shaft 18, and to which the shaft is keyed as shown. This casing K is made up of three sections 23, 24, 25, each section being in the form of an annulus with the exception of the front section which includes a disc 26 on which the collar 22 is formed. The casing sections have rabbited edges 27, and between these edges are fitted the peripheral edges of partitions 28, 28 having central but eccentric openings 29.

The rear side of the casing K is closed by a disc 30 likewise provided with a central but eccentric opening 31. This disc 30 is secured against the rear casing section 25, and the several sections 23, 24, and 25 are secured to each other to form a completely closed casing, by means of a multiplicity of bolts 32. These bolts are disposed at circumferentially spaced intervals within the casing (Fig. 2), with one of their ends threaded into the disc 30. The bolts extend through suitable openings formed in the partitions 28, thus securing the latter against any circumferential movement within the casing.

The partitions 28, together with the discs 26 and 30, provide three separate and distinct compartments 33, 34, and 35, and in each compartment is contained the driving and driven rotors R an R', respectively, for the respective clutch A, B, or C.

Each driving rotor R comprises a disc 36 having an axial hub 37, and an annular series of spaced and tapered fingers 38, on its periphery, and between which extend the bolts 32 (Fig. 2). On each finger is a vane 39 and thus an annular series of vanes 39 are provided on one side of the driving rotor (Fig. 5).

Each driven rotor R' comprises a disc 40 having an axial hub 41 and peripherial recesses providing an annular series of spaced and tapered fingers 42. On each finger is fixed a vane 43, and thus an annular series of valves are provided on that side of the driven rotor facing the driving rotor. Circular gaskets 28a, 28a are fitted in suitable grooves in the partitions 28, 28 to contact with the discs 36 of the clutches B and C, and thus seal the compartments 33, 34 and 35 against the escape of fluid.

The hubs 37 of driving rotors for the fluid clutches A and B are rotatably fitted on a solid intermediate shaft 44, while the hub 37 of the driving rotor for the fluid clutch C is rotatably fitted on a second intermediate shaft 45 which is tubular and rotatably receives the solid shaft 44.

The hub 41 of the driven rotor for the fluid clutch A is pinned to the intermediate shaft 44, while the hub 41 of the driven rotor for the clutch B, is pinned to the intermediate shaft 45. The hub 41 of the driven rotor for the clutch C, is pinned to a third intermediate shaft 46. This shaft 46 is also tubular and rotatably receives the shaft 45.

All three intermediate shafts 44, 45, and 46 extend through a suitable bearing 47 of the partition 19, while secured to the shaft 46 is a small disc 48 spanning the opening 31 and carrying a gasket 49 which prevents escape of fluid from the housing at this point.

Referring again to Fig. 1, the rear compartment 21 contains a selective speed transmission having two power trains, and which, in the present instance, is a gear transmission having two gear trains of different speed ratios, one for low speed and another for intermediate speed. The gear trains have gears common to each other as is usual in such transmissions, but for convenience the two gear trains shall be referred to as separate entities.

The low speed gear train comprises a drive gear 50 fixed to the rear end of the intermediate shaft 46, and which constantly meshes with a driven gear 51 rotatable on a counter-shaft 52 journaled in the rear wall 15 and the partition 19. The gear 51 is adapted to drive the countershaft 52 through an overrunning clutch D which is conventional in that it comprises a shell 53 fixed to the gear 51 and a cam wheel 54 keyed to the countershaft and operable to drive the latter through rollers 55 only when the rotational speed of the gear 51 in a clockwise direction exceeds that of the countershaft.

The remainder of the low gear train comprises a driven gear 56 keyed to the countershaft 52 and constantly meshing with a forward driving gear 57 keyed on the solid intermediate shaft 44. Thus it can be said that the gears 50 and 51 constitute one part of the low gear train, and the gears 56 and 57 the other part thereof, with the clutch D providing a means for operatively connecting the two parts only when the rotational speed of the gear 51 exceeds that of the countershaft, and thus completing the low gear train from the shaft 46 to the gear 57.

The shaft 44 has a pilot bearing connection 58 with the forward end of a driven shaft 59 journaled in the rear housing wall 15 and which is adapted for connection to the rear axle of a motor vehicle. On the driven shaft 59 is splined one part 60 of a jaw clutch J, the other clutch part 61 being fixed on the gear 57. Fixed to the clutch part 60 is a collar 62 and a reverse gear 63, a yoke 64 engaging the collar and operable by a rod 65 to shift the clutch part 60 into and out of engagement with the clutch part 61, thus drivingly connecting the gear 57 to the driven shaft 59. Also, by actuating the rod 65 the reverse gear 63 may be brought into or out of mesh with an idler pinion 66 meshing with a reverse pinion 67 keyed on the countershaft 52.

The intermediate gear train of the gear transmission comprises a gear 68 keyed to the rear end of the shaft 45 and constantly meshing with a second gear 69 normally rotatable on the countershaft 52 but adapted to drive the countershaft through an overrunning clutch D' of the same construction as the clutch D. When the rotational speed of the gear 69 exceeds that of the countershaft the clutch D' functions to drivingly connect the gear to the shaft. The remainder of the intermediate gear train is made up of the gears 56 and 57 by which the countershaft 52 may be propelled through the clutch J.

Manifestly, the aforedescribed intermediate gear train essentially consists of two parts, one part being the gears 68 and 69 and the other part being the gears 56 and 57. The clutch D' functions to operatively connect the two parts only when the gear 69 is driven at a predetermined speed, and, incidentally, a speed in excess of that of the gear 51.

In practice, the compartments 33, 34 and 35 of the three fluid clutches A, B, and C are partially filled with oil or other suitable fluid, while the compartment 21 is supplied with a lubricant for the gear transmission.

In operation of my automatic variable speed transmission, let it be assumed that the engine or driving shaft 19 is rotating slowly or at what would correspond to an idling speed of the engine. Such rotation of the driving shaft 18 produces a corresponding rotation of the casing K and the three driving rotors R for the three fluid clutches, because the rotors are impelled by the casing through the bolts 32 abutting the fingers 36. However, due to the slow rotation of the driving rotors the circulation of fluid in the clutches has no appreciable effect on the driven rotors R', and, hence, the torque transmitted to the intermediate shafts 44, 45 and 46, is insufficient to effect turning thereof, and, therefore, the driven shaft 59 remains at rest.

Upon acceleration of the engine from its idling speed, the resulting velocity of the now increased circulated fluid in all of the clutches, is converted into torque against the vanes 43, which is of such intensity as to revolve the driven rotors R'. At this point it should be explained that while all three driven rotors are now actuated, and, in consequence, all three shafts 44, 45, and 46 now rotated, the degree of torque now developed is only sufficient to operate the low gear train of the transmission because of the load imposed by the vehicle on the driven shaft 59. Therefore, only that power developed by the shaft 46 is transmitted to the driven shaft. Such power transmission is as follows: From gear 50 to gear 51, clutch D which is now operable to drive countershaft 52, gear 56 to gear 57, and thence to shaft 59 through clutch J.

Upon further increase in rotational speed of the casing K resultant of accelerated engine speed or decrease in load, the speed and torque developed by the clutches of necessity increases. Such increase now causes the driven rotor for the clutch B to drive shaft 45 at a speed which renders the clutch D inactive and the clutch D' active to connect gear 69 to shaft 52 and thereby drive the latter at a greater speed than the low gear train is tending to revolve it. Thus the drive is now through the intermediate gear train embodying the gears 68, 69, 56 and 57 to the shaft 59.

With still further increase in rotational speed of the casing K beyond that at which the intermediate gear train is active, the resultant increase in speed and torque developed by the clutches is now such that driven rotor R' for clutch A now takes over. This is because the rotational speed of shaft 44 as driven by clutch A, is such that countershaft 52 is driven through gears 57 and 56 at a speed higher than gears 68 and 69 tend to revolve it. Therefore, the overrunning clutch D' is no longer active and, hence, the intermediate train is no longer operative to drive the driven shaft 59, and, in consequence, the drive is now directly from the shaft 44 to the shaft 59 in a one-to-one ratio.

In the aforedescribed operation, it will be apparent that the driven rotors R' operate at speeds directly proportional to their speed ratios until acceleration has reached a point where a direct drive prevails at which point all three driven rotors revolve at the same speed.

Manifestly, any heavy increase in load, or sufficient decrease in engine speed, will reverse the cycle of operation of the mechanism to automatically cause engagement of the respective clutches D and D' in effecting the next lower gear train to drive the driven shaft at a correspondingly reduced speed. Thus it becomes apparent that, my invention is wholly automatic to select from the speed transmission at a time determined by speed and torque, that power train of that speed ratio necessary to drive the driven shaft at any desired speed. This is not only true as to forward speeds but also to reverse speeds, for it is apparent that by shifting reverse gear 63 into mesh with pinion 66, and at the same time declutching gear 57, driven shaft 59 will be driven in a reverse direction and at a speed depending upon the torque transmitted automatically thereto through the respective gear trains.

As previously stated herein my invention includes also a particular form of fluid clutch which, while admirably adapted to my automatically variable speed transmission mechanism, is not limited to such use but may be employed in any capacity where a hydraulic torque converter is required.

Although three of my fluid clutches are disclosed in Fig. 1, in describing the transmission mechanism of my invention only such reference was made to the fluid clutches as was necessary to a clear understanding of the operation of the entire mechanism, and at the same time to avoid limiting the mechanism to any particular form of fluid clutch.

Each fluid clutch A, B, or C is structurally characterized in one respect by the driven rotor R' being wholly within the driving rotor R, and thus the overall width of the two rotors is equal only to the width of the driving rotor. This permits housing of the two rotors in a casing which only slightly exceeds the width of the driving rotor. As for example in Fig. 1 the width of the casing for any one clutch is equal to the distance between the two partitions 28, 28, or the distance between one partition 28 and one end wall 26 or 30 of the casing K.

A fluid clutch of such a narrow construction is of particular advantage where the space is limited as in a motor vehicle, and where a plurality of fluid clutches are employed as in my transmission mechanism.

My fluid clutch is also characterized by the driving rotor R having its annular series of vanes 39 disposed radially, and the driven rotor R' having each vane 43 of its circular series disposed at an angle to a line radially of the rotor so that all vanes are inclined in the direction of rotation of the rotor (Figs. 2, 7, and 9).

A further and perhaps more important characterizing feature of my fluid clutch, is the arrangement of the rotors R and R' in the casing. As shown in Figs. 1, 2, and 7, the intermediate shaft 44 constitutes the axis of rotation of the rotors R and R', while the axis of rotation for the casing K is the driving shaft 18. As these two shafts 44 and 18 are disalined (Fig. 1), the rotors R and R' are, as a consequence, mounted eccentrically within and with respect to the casing K (Fig. 2). This eccentric arrangement provides a chamber E (Figs. 2 and 7) of substantially crescent form between the circle defined by the fingers 38 and the inner periphery of the casing.

The operation of the fluid clutch is as follows:

With rotation of shaft 18, casing K is driven in a counterclockwise direction as when viewed in Fig. 7, to, in turn, drive the rotor R through the bolts 32. Under such rotation of the casing centrifugal force moves the fluid contained in the casing outwardly against the inner wall thereof to assume the circular form illustrated by the broken lines in Fig. 7. Here the fluid is rotated by the vanes 39 of the driving rotor as well as the casing, to generate kinetic energy in the fluid. Inasmuch as the driven rotor vanes 43 project into the now rotating body of fluid, the kinetic energy possessed by the fluid is expended against the vanes 43, thereby transferring the torque of the driving rotor to the driven rotor.

By reason of the eccentric mounting of the rotors R and R' in the casing K, the fluid is permitted to run free with the housing through the wide portion of the chamber E. But through the narrow portion of the chamber the fluid is forced into contact with the vanes 43. During the free running period of the fluid kinetic energy is accumulated to a maximum therein, because its motion is unimpeded by the vanes 43. However, during the major and remaining period of the cycle of fluid circulation, that energy accumulated is expended fully against the vanes 43.

In this manner is effected the hydraulic transfer of torque from driving rotor to driven rotor, with only a minimum power loss. This power loss is further reduced by virtue of the angular arrangement of vanes 43, for it will be clear that as the fluid is impelled against the vanes 43 by the vanes 39, such angular positioning of the vanes 43 causes a maximum expension thereagainst of the energy accumulated in the fluid.

Another factor which contributes to high efficiency in power transfer from driving rotor to driven rotor, is the fact that because of the concentric arrangement of the two circular series of rotor vanes, there is practically no leakage of fluid between the two series of vanes.

In the operation of each fluid clutch A, B, or C in the transmission mechanism of Fig. 1, the rotors R and R' having a center of rotation offset in respect to the center of rotation of the casing K, there is of necessity relative movement radially between the rotors and the casing, which is permitted by the eccentric openings 29 and 31, and the spacing of the fingers 38 which allows the bolts 32 to move inwardly and outwardly.

Although I have herein shown and described only one form of automatic variable speed transmission mechanism, and one form of fluid clutch, each embodying my invention, it is to be understood that various changes and modifications may be made herein without departing from the spirit of my invention and the spirit and scope of the appended claims.

I claim:

1. In a variable speed transmission mechanism, a driving shaft; a casing of annular sections fixed one to the other; partitions between the sections and secured therefor dividing the casing interiorly into compartments, said casing being fixed to said driving shaft for rotation thereby and each compartment adapted to contain a body of fluid; a plurality of fluid clutches one in each of said compartments and each having a driving rotor fixed to said casing and a driven rotor through the fluid in the compartment; sealing means in said compartments for preventing the escape of fluid from therefrom; a plurality of intermediate shafts one for each of said driven rotors and fixed thereto; a driven shaft; and means for operatively connecting said driven shaft to any one of said intermediate shafts.

2. In a variable speed transmission mechanism, a driving shaft; a casing of annular sections fixed on to the other; partitions between the sections and secured thereto for dividing the casing interiorly into compartments, said casing being fixed to said driving shaft for rotation thereby and each compartment adapted to contain a body of fluid; a plurality of fluid clutches one in each of said compartments and each having a driving rotor fixed to said casing and a driven rotor operable by the driving rotor through the fluid in the compartment; gaskets carried by said partitions and contacting with said driven rotors to seal the compartments against the escape of fluid therefrom; a plurality of intermediate shafts one for each of said driven rotors and fixed thereto; a driven shaft; and means for operatively connecting said driven shaft to any one of said intermediate shafts.

WILLIAM R. McKAY.